(12) United States Patent
Lee et al.

(10) Patent No.: US 11,996,563 B2
(45) Date of Patent: *May 28, 2024

(54) SECONDARY BATTERY COMPRISING ELECTRODE TAB PROVIDED WITH INSULATION COATING LAYER

(71) Applicant: LG ENERGY SOLUTION, LTD., Seoul (KR)

(72) Inventors: Joo-Sung Lee, Daejeon (KR); Myung-Soo Ko, Daejeon (KR); Joo-Young Chung, Daejeon (KR); Shin-Hyo Cho, Daejeon (KR); Sun-Mi Jin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,592

(22) Filed: Aug. 29, 2023

(65) Prior Publication Data
US 2023/0402610 A1 Dec. 14, 2023

Related U.S. Application Data

(63) Continuation of application No. 16/615,573, filed as application No. PCT/KR2019/000171 on Jan. 4, 2019, now Pat. No. 11,777,095.

(30) Foreign Application Priority Data

Jan. 4, 2018 (KR) .................. 10-2018-0001303

(51) Int. Cl.
H01M 4/62 (2006.01)
H01M 4/131 (2010.01)
(Continued)

(52) U.S. Cl.
CPC .......... *H01M 4/623* (2013.01); *H01M 4/131* (2013.01); *H01M 4/1391* (2013.01);
(Continued)

(58) Field of Classification Search
CPC ............. H01M 50/176; H01M 50/178; H01M 50/534; H01M 50/553; H01M 50/579; H01M 10/0525; H01M 2300/004
See application file for complete search history.

(56) References Cited

U.S. PATENT DOCUMENTS

2006/0199294 A1 9/2006 Fujikawa et al.
2007/0122715 A1 5/2007 Fujino et al.
(Continued)

FOREIGN PATENT DOCUMENTS

CN 107749457 A 3/2018
EP 2437330 A1 4/2012
(Continued)

OTHER PUBLICATIONS

English translation of KR Publication 2016-0063186, Jun. 2016.*
(Continued)

*Primary Examiner* — Brittany L Raymond
(74) *Attorney, Agent, or Firm* — Morgan, Lewis & Bockius LLP (57) ABSTRACT

Provided is a secondary battery which includes an electrode assembly having an electrode tab extended from an electrode current collector, wherein the electrode tab is provided with an insulation coating layer containing an inorganic filler and a binder, the binder has an electrolyte uptake more than 0% and less than 50%, and the electrolyte uptake is determined by a predetermined method. In the secondary battery according to the present disclosure, the insulation coating layer provided in the electrode tab includes a binder having a low electrolyte uptake, and thus the insulation (Continued)

coating layer has improved adhesion and is prevented from detachment from the electrode tab. As a result, it is possible to maintain an excellent insulation state and to minimize an internal short-circuit in a secondary battery, thereby ensuring safety.

28 Claims, 2 Drawing Sheets

(51) Int. Cl.
*H01M 4/1391* (2010.01)
*H01M 10/0525* (2010.01)
*H01M 50/178* (2021.01)
*H01M 50/536* (2021.01)

(52) U.S. Cl.
CPC ...... *H01M 10/0525* (2013.01); *H01M 50/178* (2021.01); *H01M 50/536* (2021.01)

(56) References Cited

U.S. PATENT DOCUMENTS

| | | | |
|---|---|---|---|
| 2008/0206652 A1 | 8/2008 | Abe et al. | |
| 2012/0189913 A1 | 7/2012 | Wakizaka et al. | |
| 2012/0264013 A1* | 10/2012 | Hiraoka | H01M 10/0566 429/211 |
| 2013/0029218 A1 | 1/2013 | Waki et al. | |
| 2013/0209861 A1* | 8/2013 | Yong | H01M 50/491 429/144 |
| 2014/0255778 A1 | 9/2014 | Huh et al. | |
| 2014/0365792 A1 | 12/2014 | Yun | |
| 2015/0044550 A1 | 2/2015 | Park et al. | |
| 2015/0155538 A1 | 6/2015 | Tang et al. | |
| 2015/0340679 A1 | 11/2015 | Shimura et al. | |
| 2016/0329547 A1* | 11/2016 | Jin | H01M 10/0525 |
| 2016/0372743 A1 | 12/2016 | Cho et al. | |
| 2017/0005318 A1 | 1/2017 | Otohata | |
| 2019/0058194 A1 | 2/2019 | Matsumura | |

FOREIGN PATENT DOCUMENTS

| | | | |
|---|---|---|---|
| JP | 2011-081992 A | | 4/2011 |
| JP | 2013-229107 A | | 11/2013 |
| JP | 2017-504932 A | | 2/2017 |
| JP | 2017-188371 A | | 10/2017 |
| KR | 10-2007-0062458 A | | 6/2007 |
| KR | 10-0758482 B1 | | 9/2007 |
| KR | 10-2008-0078539 A | | 8/2008 |
| KR | 10-2014-0112609 A | | 9/2014 |
| KR | 10-2015-0017580 A | | 2/2015 |
| KR | 10-2015-0050974 A | | 5/2015 |
| KR | 10-2016-0045033 A | | 4/2016 |
| KR | 2016-0063186 | * | 6/2016 |
| KR | 10-2016-0125720 A | | 11/2016 |
| KR | 10-2017-0027403 A | | 3/2017 |
| KR | 10-2017-0111745 A | | 10/2017 |
| WO | 2014/091857 A1 | | 6/2014 |
| WO | 2015/015894 A1 | | 2/2015 |
| WO | 2015/147066 A1 | | 10/2015 |
| WO | 2017/150048 A1 | | 9/2017 |

OTHER PUBLICATIONS

Extended European Search Report issued from the European Patent Office dated Nov. 10, 2020 in a corresponding European Patent Application No. 19736235.3.

International Search Report issued in corresponding International Patent Application No. PCT/KR2019/000171, dated Apr. 12, 2019.

* cited by examiner

FIG. 1

FIG. 2 ized to have a size in which the electrode assembly 100, the electrode tabs 10, 11 and electrode leads 20, 21 may be received.

SECONDARY BATTERY COMPRISING ELECTRODE TAB PROVIDED WITH INSULATION COATING LAYER

The present application is a continuation of U.S. patent application Ser. No. 16/615,573, filed on Nov. 21, 2019, which claims priority to Korean Patent Application No. 10-2018-0001303 filed on Jan. 4, 2018 in the Republic of Korea, the disclosures of which including the specification and drawings are incorporated herein by reference.

TECHNICAL FIELD

The present disclosure relates to a secondary battery including an electrode tab provided with an insulation coating layer. More particularly, the present disclosure relates to a secondary battery including an electrode tab provided with an insulation coating layer containing a binder having a low electrolyte uptake.

BACKGROUND ART

As technological development and needs for mobile instruments have been increased, secondary batteries have been increasingly in demand as energy sources. Therefore, many studies have been conducted about batteries that meet various needs.

Typically, in terms of battery shapes, prismatic batteries and pouch-type batteries having a small thickness and applicable to commercial products, such as cellular phones, are in high demand. In terms of materials, lithium secondary batteries, such as lithium cobalt polymer batteries, having high energy density, discharge voltage and output stability are in high demand.

One of the main study subjects in such secondary batteries is to improve safety. In general, a lithium secondary battery may cause explosion due to high temperature and high voltage in the battery that may result from abnormal operating states of the battery, such as an internal short-circuit, overcharged state beyond the acceptable current and voltage, exposure to high temperature and impact caused by dropping. For example, it is probable that such a secondary battery causes an internal short-circuit upon impact, such as dropping or application of external force.

Figure 1:
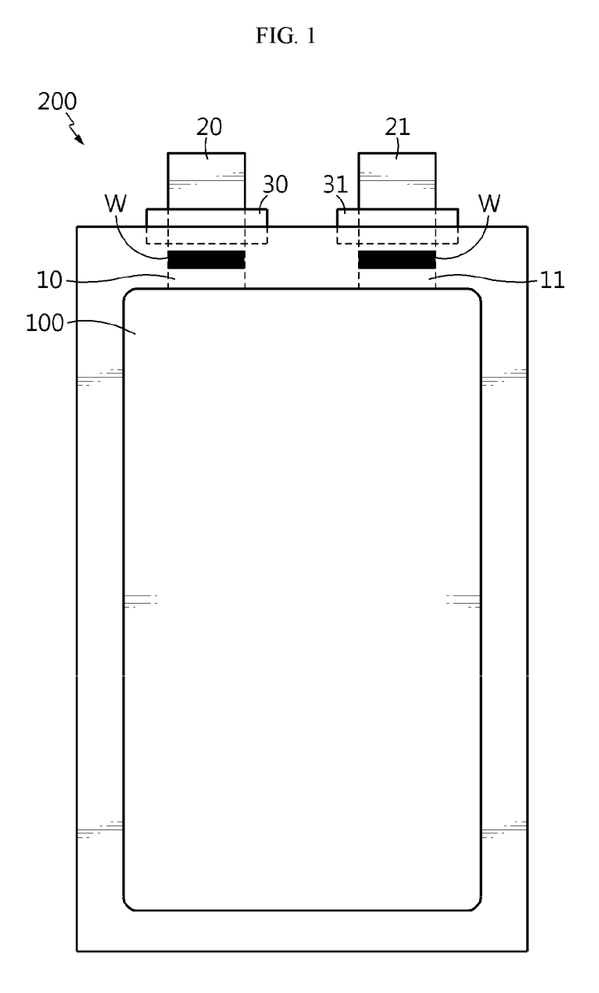
FIG. 1 is a schematic view illustrating a general structure of a conventional pouch-type secondary battery.

FIG. 1 is a schematic view illustrating a general structure of a pouch-type secondary battery.

Referring to FIG. 1, the secondary battery 10 includes an electrode assembly 100, a battery casing 200, electrode tabs 10, 11 and electrode leads 20, 21.

The electrode assembly 100 includes a positive electrode plate, a negative electrode plate and a separator. The electrode assembly 100 may be formed by stacking positive electrode plates and negative electrode plates successively with a separator interposed between a positive electrode plate and a negative electrode plate. Typically, the electrode assembly 100 may include a jelly roll (wound type) electrode assembly formed by winding long sheet-type positive electrodes and negative electrodes with a separator interposed between a positive electrode and a negative electrode, a stacked (stacked type) electrode assembly formed by stacking a plurality of positive electrodes and negative electrodes cut into units having a predetermined size with a separator interposed between a positive electrode and a negative electrode, a stacked/folded type electrode assembly obtained by winding bi-cells or full cells formed by stacking predetermined units of positive electrodes and negative electrodes with a separator interposed between a positive electrode and a negative electrode, or the like.

The battery casing 200 may be formed to have a size in which the electrode assembly 100, the electrode tabs 10, 11 and electrode leads 20, 21 may be received.

The electrode tabs 10, 11 are extended from the electrode assembly 100. For example, the positive electrode tab 10 is extended from the positive electrode plate and the negative electrode tab 11 is extended from the negative electrode plate. Herein, when the electrode assembly 100 is formed by stacking a plurality of positive electrode plates and negative electrode plates, the electrode tabs 10, 11 are extended from each of the positive electrode plates and negative electrode plates. Herein, the electrode tabs 10, 11 may not be exposed directly to the outside of the battery casing 200 but may be exposed to the outside of the battery casing 200 through the connection with another constitutional element, such as electrode leads 20, 21.

The electrode leads 20, 21 are electrically connected with the electrode tabs 10, 11 extended from the positive electrode plates and negative electrode plates, respectively, in a part thereof. Herein, the electrode leads 20, 21 may be joined with the electrode tabs 10, 11 through a method, such as welding, as shown by the shaded portion W in FIG. 1. For example, the electrode leads 20, 21 may be welded with the electrode tabs 10, 11 through a method, such as general resistance welding, ultrasonic wave welding, laser welding, rivet, or the like. In addition, the electrode leads 20, 21 may further include sealing tapes 30, 31 in a portion connected to the exposed part of the electrode leads.

In the case of a pouch-type secondary battery using a plurality of positive electrodes and negative electrodes, positive electrode tabs and negative electrode tabs extended from the electrodes are joined with the electrode leads through a conventional binding method.

Such a secondary battery shows a high possibility of ignition in a thermal abuse test, when the temperature of the surroundings of an electrode tab, such as a positive electrode tab, is increased, the separator is shrunk at the corresponding portion and the positive electrode tab is in contact with the charged negative electrode. Particularly, ignition of the electrode tab portion becomes severe upon high-rate charge/discharge. Thus, it is required to reinforce the safety of the corresponding portion.

To solve an internal short-circuit of such a battery, there has been suggested a method for attaching an insulation member to an electrode tab. It is known that the insulation member is formed by coating an electrode tab portion with slurry obtained by dispersing a mixture containing a binder used for insulation with an inorganic filler used for image recognition. The binder contained in such an insulation member becomes soft by absorbing an electrolyte during the charge/discharge of a secondary battery, resulting in degradation of the adhesion of the insulation member. In addition, when a thermal and mechanical abuse mode is operated at the same time, the electrode tab portion is deformed to cause detachment of the insulation member undesirably.

DISCLOSURE

Technical Problem

The present disclosure is designed to solve the problems of the related art, and therefore the present disclosure is directed to providing a secondary battery which shows a minimized internal short-circuit and has reinforced safety by using an electrode tab provided with an insulation coating layer having improved adhesion to the electrode tab so as to prevent detachment.

Technical Solution

In one aspect of the present disclosure, there is provided a secondary battery according to any one of the following embodiments.

According to the first embodiment, there is provided a secondary battery which includes an electrode assembly having an electrode tab extended from an electrode current collector, wherein the electrode tab is provided with an insulation coating layer containing an inorganic filler and a binder, the binder has an electrolyte uptake more than 0% and less than 50%, and the electrolyte uptake is determined by the method including the steps of: preparing an electrolyte including an organic solvent containing a mixture of ethylene carbonate, propylene carbonate and diethyl carbonate, and a lithium salt; molding the binder into a film shape, cutting the film into a predetermined size, weighing the binder before dipping, dipping the film in the electrolyte at room temperature for 1 hour and removing the film from the electrolyte, and weighing the binder after dipping; and calculating the electrolyte uptake by using the following Formula 1:

$$\frac{\text{Weight after dipping}}{\text{Weight before dipping}} \times 100\ (\%) \qquad \text{[Formula 1]}$$

According to the second embodiment, there is provided a secondary battery which includes an electrode assembly having an electrode tab extended from an electrode current collector, wherein the electrode tab is provided with an insulation coating layer containing an inorganic filler and a binder, the binder has an electrolyte uptake more than 0% and less than 150%, and the electrolyte uptake is determined by the method including the steps of: preparing an electrolyte including an organic solvent containing a mixture of ethylene carbonate, propylene carbonate and propyl propionate, and a lithium salt; molding the binder into a film shape, cutting the film into a predetermined size, weighing the binder before dipping, dipping the film in the electrolyte at room temperature for 1 hour and removing the film from the electrolyte, and weighing the binder after dipping; and calculating the electrolyte uptake by using the following Formula 1:

$$\frac{\text{Weight after dipping}}{\text{Weight before dipping}} \times 100\ (\%) \qquad \text{[Formula 1]}$$

According to the third embodiment, there is provided the secondary battery as defined in the first embodiment or the second embodiment, wherein ethylene carbonate is used in an amount of 20 parts by weight or more based on 100 parts by weight of the total weight of the organic solvent.

According to the fourth embodiment, there is provided the secondary battery as defined in the third embodiment, wherein ethylene carbonate, propylene carbonate and diethyl carbonate are mixed at a weight ratio of 30:20:50.

According to the fifth embodiment, there is provided the secondary battery as defined in the third embodiment, wherein ethylene carbonate, propylene carbonate and propyl propionate are mixed at a weight ratio of 30:10:60.

According to the sixth embodiment, there is provided the secondary battery as defined in any one of the first to the fifth embodiments, wherein the binder includes styrene-butadiene rubber containing a repeating unit derived from a monomer having a crosslinkable group.

According to the seventh embodiment, there is provided the secondary battery as defined in any one of the first to the sixth embodiments, wherein the binder includes styrene-butadiene rubber containing 12 parts by weight or less of a repeating unit derived from an acrylic acid (AA) monomer.

According to the eighth embodiment, there is provided the secondary battery as defined in the seventh embodiment, wherein the binder is a styrene-butadiene-acrylic acid copolymer.

According to the ninth embodiment, there is provided the secondary battery as defined in any one of the first to the eighth embodiments, wherein the binder includes a fluoride-based binder polymer containing 90 parts by weight or more of a repeating unit derived from a vinylidene fluoride (VdF) monomer.

According to the tenth embodiment, there is provided the secondary battery as defined in the ninth embodiment, wherein the fluoride-based binder polymer is polyvinylidene fluoride.

According to the eleventh embodiment, there is provided the secondary battery as defined in any one of the first to the tenth embodiments, wherein the insulation coating layer includes the inorganic filler and the binder at a weight ratio of 5:95-80:20.

According to the twelfth embodiment, there is provided the secondary battery as defined in any one of the first to the eleventh embodiments, wherein the inorganic filler includes $SiO_2$, $TiO_2$, $Al_2O_3$, AlOOH, $\gamma$-AlOOH, $ZrO_2$, $SnO_2$, $CeO_2$, MgO, CaO, ZnO, $Y_2O_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), $BaTiO_3$, hafnia ($HfO_2$), $SrTiO_3$ or a mixture thereof.

According to the thirteenth embodiment, there is provided the secondary battery as defined in any one of the first to the twelfth embodiments, wherein the insulation coating layer further includes a dispersing agent.

According to the fourteenth embodiment, there is provided the secondary battery as defined in the thirteenth embodiment, wherein the insulation coating layer includes the dispersing agent in an amount of 0.1-5 wt % based on the weight of the inorganic filler.

According to the fifteenth embodiment, there is provided the secondary battery as defined in any one of the first to the fourteenth embodiments, wherein the electrode tab is a positive electrode tab.

Advantageous Effects

In the secondary battery according to the present disclosure, the insulation coating layer provided in the electrode tab includes a binder having a low electrolyte uptake, and thus the insulation coating layer has improved adhesion and is prevented from detachment from the electrode tab. As a result, it is possible to maintain an excellent insulation state and to minimize an internal short-circuit in a secondary battery, thereby ensuring safety.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided a secondary battery including an electrode assembly having an electrode tab extended from an electrode current collector, particularly including an electrode assembly which includes a positive electrode having a positive electrode tab extended from a positive electrode current collector, a negative electrode having a negative electrode tab extended from a negative electrode current collector, and a separator interposed between the positive electrode and the negative electrode.

According to an embodiment of the present disclosure, the electrode tab is provided with an insulation coating layer containing an inorganic filler and a binder.

The binder is an ingredient which functions to impart insulation property and is used for the adhesion between inorganic fillers or the adhesion between the inorganic filler and the electrode tab, and is characterized in that it has an electrolyte uptake more than 0% and less than 50%, wherein the electrolyte uptake is determined by the method including the steps of: preparing an electrolyte including an organic solvent containing a mixture of ethylene carbonate, propylene carbonate and diethyl carbonate, and a lithium salt; molding the binder into a film shape, cutting the film into a predetermined size, weighing the binder before dipping, dipping the film in the electrolyte at room temperature (25° C.) for 1 hour and removing the film from the electrolyte, and weighing the binder after dipping; and calculating the electrolyte uptake by using the following Formula 1:

$$\frac{\text{Weight after dipping}}{\text{Weight before dipping}} \times 100\ (\%) \quad \text{[Formula 1]}$$

According to an embodiment of the present disclosure, the electrolyte uptake may be more than 0% and less than 50%, 3-47%, or 6-47%.

Herein, the electrolyte may include ethylene carbonate (EC) in an amount of 20 parts by weight or more based on 100 parts by weight of the total organic solvent.

According to an embodiment of the present disclosure, ethylene carbonate (EC), propylene carbonate (PC) and diethyl carbonate (DEC) may be mixed at a weight ratio of 30:20:50-20:10:70, preferably 30:20:50.

According to an embodiment of the present disclosure, the secondary battery includes an electrode assembly and an electrolyte injected thereto, wherein the electrolyte may be the same as the electrolyte used for determination of the electrolyte uptake.

Meanwhile, it is preferred to substitute diethyl carbonate (DEC) with propyl propionate (PP) in the ingredients of the organic solvent contained in the electrolyte in order to realize a secondary battery capable of operating at a high voltage. For example, decomposition of diethyl carbonate (DEC) is accelerated upon operation at a high voltage, while a secondary battery using an electrolyte containing propyl propionate (PP) at a predetermined ratio can be operated at a high voltage of 4.25V or more, particularly 4.4V or more, without decomposition. When a secondary battery capable of operating at a high voltage is to be realized, the binder shows an electrolyte uptake more than 0% and less than 150%, wherein the electrolyte uptake is determined by the method including the steps of: preparing an electrolyte including an organic solvent containing a mixture of ethylene carbonate, propylene carbonate and propyl propionate, and a lithium salt; molding the binder into a film shape, cutting the film into a predetermined size, weighing the binder before dipping, dipping the film in the electrolyte at room temperature (25° C.) for 1 hour and removing the film from the electrolyte, and weighing the binder after dipping; and calculating the electrolyte uptake by using the following Formula 1:

$$\frac{\text{Weight after dipping}}{\text{Weight before dipping}} \times 100\ (\%) \quad \text{[Formula 1]}$$

According to an embodiment of the present disclosure, the electrolyte uptake may be more than 0% and less than 150%, 3-130%, or 12-127%.

Herein, the electrolyte may include ethylene carbonate (EC) in an amount of 20 parts by weight or more based on 100 parts by weight of the total organic solvent.

According to an embodiment of the present disclosure, ethylene carbonate (EC), propylene carbonate (PC) and propyl propionate (PP) may be mixed at a weight ratio of 30:20:50-20:10:70, preferably 25:10:65 or 30:10:60.

According to an embodiment of the present disclosure, the secondary battery includes an electrode assembly and an electrolyte injected thereto, wherein the electrolyte may be the same as the electrolyte used for determination of the electrolyte uptake.

The electrolyte uptake of the binder determined as described above is an index indicating electrolyte resistance, wherein a binder having a low electrolyte uptake shows high adhesion even in a state wetted with an electrolyte. Therefore, such a binder can alleviate a decrease in adhesion caused by the electrolyte absorption of the binder contained in the insulation coating layer during charge/discharge of a secondary battery. As a result, it is possible to inhibit detachment of the insulation coating layer. On the other hand, an insulation coating layer containing a binder having a high electrolyte uptake undergoes a decrease in adhesion, and thus may be detached from an electrode tab with ease.

Binders having a low electrolyte uptake may include styrene-butadiene rubber including a styrene monomer-derived repeating unit and a butadiene monomer-derived repeating unit at a weight ratio of 70:30-30:70. Particularly, such styrene-butadiene rubber includes a repeating unit derived from a styrene monomer having a hydrophobic group within the above-defined range, and thus has a controlled electrolyte uptake.

In addition, the combined weight of the styrene monomer-derived repeating unit with the butadiene monomer-derived repeating unit may be 30-100 w % or 30-70 wt % based on the total weight of the styrene-butadiene rubber. Within the above-defined range, it is possible to control the electrolyte uptake.

Particular examples of the styrene monomer include styrene, α-methylstyrene, p-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, and derivatives and mixtures thereof. Particular examples of the butadiene monomer include 1,3-butadiene, isoprene, 2,3-dimethyl-1,3-butadiene, 2-ethyl-1, 3-butadiene, and derivatives and mixtures thereof.

If desired, the styrene-butadiene rubber may further include a repeating unit derived from a monomer having a crosslinkable group. Herein, the repeating unit derived from a monomer having a crosslinkable group is used preferably in an amount of 12 parts by weight or less based on the total weight of the styrene-butadiene rubber.

According to an embodiment of the present disclosure, the binder may include styrene-butadiene rubber containing 12 parts by weight or less of a repeating unit derived from an acrylic acid (AA) monomer. When the content of the repeating unit derived from an acrylic acid monomer is 12 parts by weight or less, it is possible to reduce the problem of disintegration of a positive electrode at a high potential caused by a low electrolyte uptake.

Particularly, the binder may be a styrene-butadiene-acrylic acid copolymer.

According to an embodiment of the present disclosure, the binder may include a fluoride-based binder polymer containing 90 parts by weight or more, or 95 parts by weight of more of a repeating unit derived from a vinylidene fluoride (VdF) monomer. When the fluoride-based binder polymer includes a vinylidene fluoride monomer within the above-defined range, it is possible to control the electrolyte uptake of the binder and to reduce the problem of disintegration of a positive electrode at a high potential.

Particularly, the fluoride-based binder polymer may be polyvinylidene fluoride.

According to an embodiment of the present disclosure, the insulation coating layer may be formed by coating an electrode tab with slurry including an inorganic filler in combination with the above-described binder and optionally further containing a dispersing agent.

The inorganic filler functions to realize a color so that the insulation coating layer may allow image recognition and enables one to recognize the position, size and thickness of an insulation coating layer provided in an electrode tab easily by the naked eyes. Non-limiting examples of the inorganic filler may include $SiO_2$, $TiO_2$, $Al_2O_3$, AlOOH, γ-AlOOH, $ZrO_2$, $SnO_2$, $CeO_2$, MgO, CaO, ZnO, $Y_2O_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), $BaTiO_3$, hafnia ($HfO_2$), $SrTiO_3$, and mixtures thereof.

In the insulation coating layer according to the present disclosure, the inorganic filler and binder may be used at a weight ratio of 5:95-80:20 or 10:90-50:50. Within the above-defined range, it is possible to obtain sufficient adhesion between inorganic fillers, sufficient adhesion between the insulation coating layer and the electrode tab and a desired insulation effect.

The dispersing agent is an ingredient which is adsorbed to the inorganic filler in the slurry for forming an insulation coating layer to assist dispersion of inorganic materials and to improve slurry stability. Herein, 'slurry stability' refers to a property of slurry with which the inorganic filler contained in the slurry is not settled for a long time but is dispersed and distributed homogeneously in the whole slurry after the slurry is applied. Herein, 'long time' may refer to a period required for the slurry to be dried, for example.

Such a dispersing agent may be exemplified by a cellulose-based compound and non-limiting examples thereof include carboxymethyl cellulose, carboxyethyl cellulose or a derivative thereof, such as a compound substituted with a cation, such as ammonium ion or primary metal ion.

In the insulation coating layer according to the present disclosure, the dispersing agent may be used in an amount of 0.1-5 wt % based on the weight of the inorganic filler. Within the above-defined range, it is possible to prevent degradation of coating properties caused by an increase in viscosity and to inhibit rapid sediment of the inorganic filler.

Meanwhile, particular examples of the solvent or dispersion medium used for the slurry for forming an insulation coating layer may include: water; alcohols, such as methanol, ethanol, propanol and butanol; ketones, such as acetone and phenylethyl ketone; ethers, such as methyl ethyl ether, diethyl ether and diisoamyl ether; lactones, such as gamma-butyrolactone; N-methyl-2-pyrrolidone (NMP); lactams, such as beta-lactam; cyclic aliphatic compounds, such as cyclopentane and cyclohexane; aromatic hydrocarbons, such as benzene and toluene; esters, such as methyl lactate and ethyl lactate; or the like. Among them, water is particularly suitable as an eco-friendly dispersion medium. In addition, N-methyl-2-pyrrolidone similar to the conventional anodic coating may be used suitably. The content of solvent is not particularly limited but is determined considering the dispersibility of the inorganic filler, coating feasibility, drying time, or the like.

According to an embodiment of the present disclosure, the insulation coating layer may be formed by applying the slurry for an insulation coating layer to the electrode tab portion of an electrode current collector, followed by drying, after slurry for an electrode active material layer is applied to and dried on the electrode collector to form an electrode active material layer.

In a variant, according to another embodiment of the present disclosure, the insulation coating layer may be formed by applying the slurry for an insulation coating layer to the electrode tab portion of an electrode current collector, followed by drying, to form an insulation coating layer, and then applying slurry for an electrode active material layer to the remaining portion of the electrode current collector having no insulation coating layer, followed by drying, to form an electrode active material layer.

In another variant, according to still another embodiment of the present disclosure, the insulation coating layer may be formed by applying slurry for an insulation coating layer to the electrode tab portion of an electrode current collector and drying the slurry, and applying slurry for an electrode active material layer to the remaining portion of the electrode current collector having no insulation coating layer and drying the slurry, at the same time.

Coating processes for forming the insulation coating layer may include but are not limited to: dipping, spray coating, spin coating, roll coating, die coating, gravure printing, bar coating, or the like.

According to an embodiment of the present disclosure, the insulation coating layer is formed preferably to have a thickness smaller than the thickness of each electrode active material layer. For example, the thickness of the insulation coating layer may be determined to be about 5-100% or 10-50% of the thickness of each electrode active material layer. When the insulation coating layer has a thickness smaller than the lower limit, it is difficult to expect an electrical insulation effect. When the insulation coating layer has a thickness larger than the upper limit, the volume of an electrode tab is increased undesirably.

Figure 2:
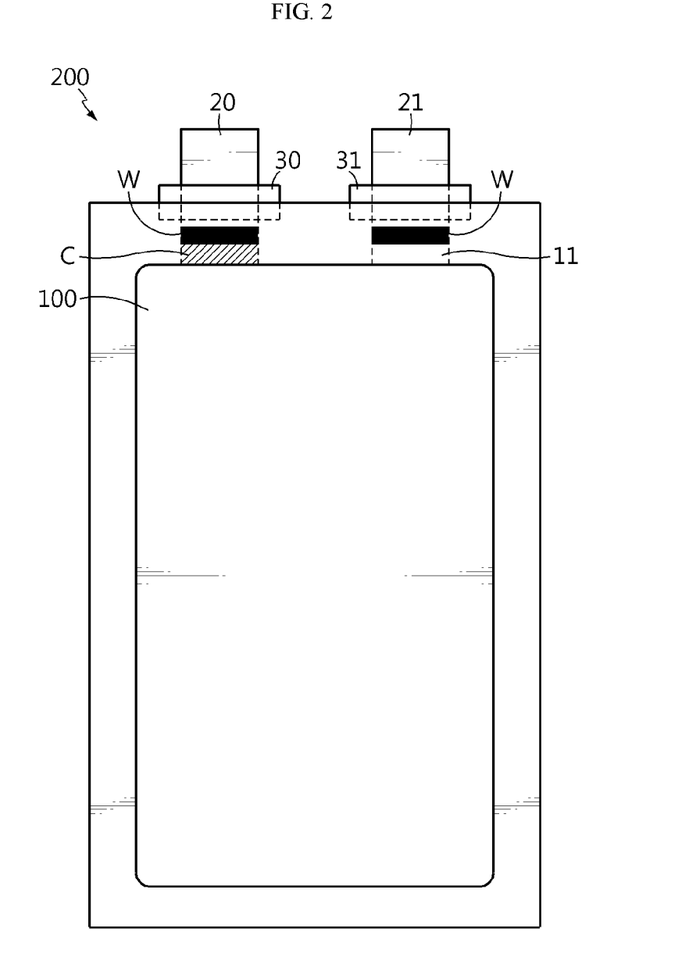
FIG. 2 is a schematic sectional view illustrating the secondary battery according to an embodiment of the present disclosure.

FIG. 2 is a schematic view illustrating the pouch-type secondary battery according to an embodiment of the present disclosure. In FIG. 2, an insulation coating layer C is formed in the positive electrode tab of the pouch-type secondary battery as shown in FIG. 1.

Since it is highly probable that the positive electrode tab is in contact preferentially with the negative electrode (current collector or active material) of the electrode assembly upon external impact caused by dropping, the slurry for forming an insulation coating layer according to the present disclosure is coated preferably on the positive electrode tab. However, insulation coating layers may be formed on both of the positive electrode tab and negative electrode tab.

In addition, only one positive electrode tab is shown in FIG. 2. However, the insulation coating layer may be formed in each of multiple positive electrode tabs and negative electrode tabs in the case of a secondary battery using multiple positive electrodes and negative electrodes and thus including multiple positive electrode tabs and negative electrode tabs.

Further, the insulation coating layer may be formed partially or totally in the electrode tab, according to the present disclosure.

In a non-limiting example of the insulation coating layer formed partially in the electrode tab, the insulation coating layer may be formed in the electrode tab portion adjacent to the electrode assembly, wherein it is highly probable that the electrode tab is in contact with the electrode assembly. Otherwise, the insulation coating layer may be formed in a portion of the electrode tab except the connection with an electrode lead.

The insulation coating layer may be formed totally in the electrode tab. Since the electrical insulation coating layer is molten and removed during welding for the connection with an electrode lead, it is possible to form an insulation coating layer in the whole electrode tab. In terms of process feasibility, it is preferred to form the insulation coating layer totally in the electrode tab.

According to the present disclosure, electrode assemblies formed by stacking positive electrodes and negative electrodes with a separator between a positive electrode and a negative electrode may be stacked to provide a stacked secondary battery or a stacked-folded secondary battery, or may be wound into a jelly-roll shape to provide a secondary battery.

The battery casing may have various shapes, such as a pouch-type casing or prismatic casing.

For example, the positive electrode is obtained by applying a mixture of a positive electrode active material, a conductive material and a binder onto a positive electrode current collector, followed by drying. If desired, a filler may be further added to the mixture.

Particular examples of the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

The positive electrode current collector is formed to have a thickness of 3-500 μm. The positive electrode current collector is not particularly limited, as long as it causes no chemical change in the corresponding battery and has high conductivity. Particular examples of the positive electrode current collector may include stainless steel; aluminum; nickel; titanium; baked carbon; aluminum or stainless steel surface-treated with carbon, nickel, titanium or silver; or the like. It is possible to increase the adhesion of a positive electrode active material by forming fine surface irregularities on the surface of a current collector. The positive electrode current collector may have various shapes, such as a film, sheet, foil, net, porous body, foam and a non-woven web body.

The conductive material is added generally in an amount of 1-50 wt % based on the total weight of the mixture including the positive electrode active material. The conductive material is not particularly limited, as long as it causes no chemical change in the corresponding battery and has conductivity. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

The binder is an ingredient which assists binding between the electrode active material and the conductive material and binding to the current collector. In general, the binder is added in an amount of 1-50 wt % based on the total weight of the mixture including the positive electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The filler is an ingredient inhibiting swelling of the positive electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

The negative electrode is obtained by applying a negative electrode active material onto a negative electrode current collector, followed by drying. If desired, the negative electrode material may further include the above-described ingredients.

The negative electrode current collector is formed to have a thickness of 3-500 μm. The negative electrode current collector is not particularly limited, as long as it causes no chemical change in the corresponding battery and has conductivity. Particular examples of the negative electrode current collector may include copper; stainless steel; aluminum; nickel; titanium; baked carbon; copper or stainless steel surface-treated with carbon, nickel, titanium or silver; aluminum-cadmium alloy; or the like. Similarly to the positive electrode current collector, it is possible to increase the adhesion of a negative electrode active material by forming fine surface irregularities on the surface of a current collector. The negative electrode current collector may have various shapes, such as a film, sheet, foil, net, porous body, foam and a non-woven web body.

Particular examples of the negative electrode active material include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me':Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymers, such as polyacetylene; Li—Co—Ni type materials; titanium oxide; lithium titanium oxide.

The separator is interposed between the positive electrode and the negative electrode. An insulating thin film having high ion permeability and mechanical strength is used as the separator. The separator generally has a pore diameter of 0.01-10 μm and a thickness of 5-300 μm. Particular examples of the separator include sheets or nonwoven webs made of olefinic polymers, such as polypropylene having chemical resistance and hydrophobic property; glass fibers or polyethylene, or the like.

According to an embodiment of the present disclosure, the lithium salt contained in the electrolyte is an ingredient that may be dissolved with ease in a mixed organic solvent of ethylene carbonate, propylene carbonate and diethyl carbonate or a mixed organic solvent of ethylene carbonate, propylene carbonate and propyl propionate. Particular examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lithium lower aliphatic carboxylate, lithium tetraphenyl borate, imide, or the like.

In addition, the electrolyte may further include pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride in order to improve the charge/discharge characteristics, flame resistance, or the like. Optionally, the electrolyte may further include a halogen-containing solvent, such as carbon tetrachloride or trifluoroethylene, in order to impart non-combustibility. The electrolyte may further include carbon dioxide gas in order to improve the high-temperature storage characteristics.

The present disclosure has been described in detail with reference to the accompanying drawings. However, it should be understood that the detailed description and specific examples, while indicating preferred embodiments of the disclosure, are given by way of illustration only, since various changes and modifications within the scope of the disclosure will become apparent to those skilled in the art from this detailed description.

Therefore, it should be understood that the above-described embodiments are for illustrative purposes only and are non-limiting.

Example 1

A dispersing agent (carboxymethyl cellulose, BG-L01, Global Leader Chem) was dissolved in water as a solvent and alumina (LS235, Nippon Light Metal Company) as an inorganic filler was added thereto at a weight ratio of the dispersing agent to the inorganic filler of 0.5 wt %. To the dispersed alumina slurry, a binder, H78 (styrene (ST):butadiene (BD):acrylic acid (AA)=57:35:8, LG Chem) was added at a weight ratio of alumina:binder of 20:80 to obtain slurry for an insulation coating layer. Herein, the binder had an electrolyte uptake of 47% to the electrolyte obtained by dissolving 1M $LiPF_6$ in a mixed solvent containing ethylene carbonate (EC), propylene carbonate (PC) and diethyl carbonate (DEC) at a ratio of 30:20:50 (weight ratio).

Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the following Formula 1:

$$\frac{\text{Weight after dipping}}{\text{Weight before dipping}} \times 100 \ (\%) \qquad \text{[Formula 1]}$$

The slurry was applied to the electrode tab portion of a positive electrode current collector so that the coating might have a thickness corresponding to 30% of the thickness of the positive electrode active material layer and a width of 1.7 mm to obtain a positive electrode provided with an insulation coating layer.

The positive electrode was used and the electrolyte (EC: PC:DEC=30:20:50) was injected to obtain a secondary battery.

Example 2

A dispersing agent (carboxymethyl cellulose, BG-L01, Global Leader Chem) was dissolved in water as a solvent and alumina (LS235, Nippon Light Metal Company) as an inorganic filler was added thereto at a weight ratio of the dispersing agent to the inorganic filler of 0.5 wt %. To the dispersed alumina slurry, a binder, H78 (styrene (ST):butadiene (BD):acrylic acid (AA)=57:35:8, LG Chem) was added at a weight ratio of alumina:binder of 2:8 to obtain coating slurry. Herein, the binder had an electrolyte uptake of 127% to the electrolyte obtained by dissolving 1M $LiPF_6$ in a mixed solvent containing ethylene carbonate (EC), propylene carbonate (PC) and propyl propionate (PP) at a ratio of 30:10:60 (weight ratio). Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

The slurry was applied to the electrode tab portion of a positive electrode current collector so that the coating might have a thickness corresponding to 30% of the thickness of the positive electrode active material layer and a width of 1.7 mm to obtain a positive electrode provided with an insulation coating layer.

The positive electrode was used and the electrolyte (EC: PC:PP=30:10:60) was injected to obtain a secondary battery.

Example 3

A secondary battery was obtained in the same manner as Example 1, except that BD53 (ST:BD=62:38, LG Chem, electrolyte uptake (EC:PC:DEC=30:20:50) 6%) was used as a binder. Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Example 4

A secondary battery was obtained in the same manner as Example 2, except that BD53 (ST:BD=62:38, LG Chem, electrolyte uptake (EC:PC:PP=30:10:60) 48%) was used as a binder. Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Example 5

A secondary battery was obtained in the same manner as Example 2, except that N-methyl-2-pyrrolidone (NMP) was used as a solvent and polyvinylidene fluoride (KF1100, Kureha, electrolyte uptake (EC:PC:PP=30:10:60) 12%) was used as a binder.

Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Example 6

A secondary battery was obtained in the same manner as Example 5, except that a polyvinylidene fluoride copolymer (8200, Kureha, electrolyte uptake (EC:PC:PP=30:10:60) 17%) was used as a binder.

Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Comparative Example 1

A secondary battery was obtained in the same manner as Example 1, except that SU006 (AA alone, Toyo Ink., electrolyte uptake (EC:PC:DEC=30:20:50) 105%) was used as a binder. Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Comparative Example 2

A secondary battery was obtained in the same manner as Example 1, except that H79 (ST:BD:AA=52:31:17, LG Chem, electrolyte uptake (EC:PC:DEC=30:20:50) 73%) was used as a binder. Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Comparative Example 3

A secondary battery was obtained in the same manner as Example 2, except that H79 (ST:BD:AA=52:31:17, LG Chem, electrolyte uptake (EC:PC:PP=30:10:60) 174%) was used as a binder. Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Comparative Example 4

Slurry for an insulation coating layer was prepared in the same manner as Example 1, except that crosslinked Li-PAA (Aekyung Chem., electrolyte uptake (EC:PC:DEC=30:20:50) 0%) was used as a binder and no dispersing agent was used. The prepared slurry for a positive electrode insulation coating layer was applied and dried first, and then slurry for a positive electrode active material layer was applied to obtain a secondary battery including a positive electrode provided with an insulation coating layer.

Herein, the electrolyte uptake of the binder was determined as follows: The binder was molded into a film shape, cut into a predetermined size and then weighed. The film was dipped in the electrolyte at room temperature (25° C.) for 1 hour and weighed. Then, the electrolyte uptake was calculated according to the above Formula 1.

Test Example 1

Five samples were prepared for each of the secondary batteries according to Examples 1-6 and Comparative Examples 1-4. Then a dropping test was carried out 100 times from a height of 1 m and a hot box test was performed by allowing each sample to stand at 140° C. for 1 hour.

As a result, all the samples according to Examples 1-6 and Comparative Example 4 passed the hot box test. On the contrary, in the case of Comparative Example 1, ignition occurred in 3 samples of 5 samples. In the case of Comparative Examples 2 and 3, ignition occurred in 1 sample of 5 samples. In other words, it is thought that since Comparative Examples 1-3 use a binder having a high electrolyte uptake for forming an insulation coating layer, the insulation coating layer is detached from the electrode tab due to a decrease in adhesion to cause an internal short-circuit.

Test Example 2

Each of the secondary batteries according to Examples 1-6 and Comparative Examples 1-4 was determined for 0.2C discharge capacity.

As a result, each of Examples 1-6 and Comparative Examples 1-3 realized designed capacity but Comparative Example 4 showed degradation of capacity by 2.1% based on designed capacity. It is thought that lithium ions cannot be transported in the region where the insulation coating layer is overlapped with the positive electrode to cause degradation of capacity.

What is claimed is:

1. A secondary battery, comprising:
an electrode assembly including:
a first electrode;
a first electrode tab extending from the first electrode; and
a first insulation coating layer disposed on the first electrode tab, the first insulation coating layer comprising a first binder and an inorganic filler,
wherein the first binder has an electrolyte uptake of more than 0% and less than 50%, the electrolyte uptake being:

$$\frac{\text{Weight After Dipping} - \text{Weight Before Dipping}}{\text{Weight Before Dipping}} \times 100 \ (\%),$$

wherein Weight Before Dipping is a weight of the first binder prepared in a predetermined shape and a predetermined size before being dipped in an electrolyte,
wherein Weight After Dipping is a weight of the prepared first binder after being dipped in the electrolyte at room temperature for one hour, and
wherein the electrolyte includes:
an organic solvent containing a mixture of ethylene carbonate (EC), propylene carbonate (PC), and diethyl carbonate (DEC); and
a lithium salt.

2. The secondary battery of claim 1, wherein the first binder has the electrolyte uptake of more than 3% and less than 47%.

3. The secondary battery of claim 1, wherein the first binder has the electrolyte uptake of more than 6% and less than 47%.

4. The secondary battery of claim 1, wherein the electrolyte uptake is determined by:
preparing the electrolyte;
preparing the first binder in the predetermined shape and the predetermined size by molding the first binder into a film shape and cutting the film into the predetermined size;
weighing the first binder prepared in the film shape and the predetermined size before dipping in the electrolyte to determine Weight Before Dipping;
dipping the prepared first binder in the electrolyte at room temperature for one hour;
removing the prepared first binder from the electrolyte; and
weighing the prepared first binder after the dipping to determine Weight After Dipping.

5. The secondary battery of claim 1, wherein the organic solvent comprises ethylene carbonate (EC), propylene carbonate (PC) and diethyl carbonate (DEC) at a weight ratio of 30:20:50 to 20:10:70.

6. The secondary battery of claim 1, wherein the first binder comprises a polyvinylidene fluoride polymer containing at least 90 parts by weight of a repeating unit derived from a vinylidene fluoride (VdF) monomer.

7. The secondary battery of claim 6, wherein a weight ratio of the inorganic filler to the first binder is 5:95 to 80:20.

8. The secondary battery of claim 6, wherein a weight ratio of the inorganic filler to the first binder is 10:90 to 50:50.

9. The secondary battery of claim 1, wherein:
the first binder provides an adhesion between the inorganic filler of the first insulation coating layer and the first electrode tab, and
the first insulation coating layer electrically insulates the first electrode tab from another electrode in the electrode assembly.

10. The secondary battery of claim 1, wherein the insulation coating layer further includes a dispersing agent in an amount of 0.1 to 5 wt % based on a total weight of the inorganic filler.

11. The secondary battery of claim 1, wherein:
the electrode assembly further includes:
a second electrode having an opposite polarity from the first electrode;
a second electrode tab extending from the second electrode; and
a second insulation coating layer disposed on the second electrode tab and comprising the same binder as the first binder in the first insulation coating layer on the first electrode tab.

12. The secondary battery of claim 1, wherein the first electrode is a positive electrode, and the first electrode tab is a positive electrode tab.

13. The secondary battery of claim 1, wherein:
the first electrode and the first electrode tab include respective portions of a first electrode current collector in the electrode assembly,
the insulation coating layer is coated on the first electrode tab portion of the first electrode current collector, and
the first electrode comprises:
a portion of the first electrode current collector not coated with the insulation coating layer; and
a mixture including an electrode active material, a conductive material, and a second binder applied to the portion of the first current collector not coated with the insulation coating layer.

14. The secondary battery of claim 1, wherein:
the first electrode includes an active material layer without being coated with the insulation coating layer, and
a thickness of the insulation coating layer is smaller than a thickness of the active material layer.

15. A secondary battery, comprising:
an electrode assembly including:
a first electrode;
a first electrode tab extending from the first electrode; and
a first insulation coating layer disposed on the first electrode tab, the first insulation coating layer comprising a first binder and an inorganic filler,
wherein the first binder has an electrolyte uptake of more than 0% and less than 150%, the electrolyte uptake being:

$$\frac{\text{Weight After Dipping} - \text{Weight Before Dipping}}{\text{Weight Before Dipping}} \times 100 \ (\%),$$

wherein Weight Before Dipping is a weight of the first binder prepared in a predetermined shape and a predetermined size before being dipped in an electrolyte,
wherein Weight After Dipping is a weight of the prepared first binder after being dipped in the electrolyte at room temperature for one hour, and wherein the electrolyte includes:
an organic solvent containing a mixture of ethylene carbonate (EC), propylene carbonate (PC), and propyl propionate (PP); and
a lithium salt.

16. The secondary battery of claim 15, wherein the first binder has the electrolyte uptake of more than 3% and less than 130%.

17. The secondary battery of claim 15, wherein the first binder has the electrolyte uptake of more than 12% and less than 127%.

18. The secondary battery according to claim 15, wherein the electrolyte uptake is determined by:
preparing the electrolyte;
preparing the first binder in the predetermined shape and the predetermined size by molding the first binder into a film shape and cutting the film into the predetermined size;
weighing the first binder prepared in the film shape and the predetermined size before dipping into the electrolyte to determine Weight Before Dipping;
dipping the prepared first binder in the electrolyte at room temperature for one hour;
removing the prepared first binder from the electrolyte; and
weighing the prepared first binder after the dipping to determine Weight After Dipping.

19. The secondary battery of claim 15, wherein the organic solvent comprises ethylene carbonate (EC), propylene carbonate (PC) and propyl propionate (PP) at a weight ratio of 25:10:65 to 30:10:60.

20. The secondary battery of claim 15, wherein the first binder comprises a polyvinylidene fluoride containing at least 90 parts by weight of a repeating unit comprises a vinylidene fluoride (VdF) monomer.

21. The secondary battery of claim 20, wherein a weight ratio of the inorganic filler to the first binder is 5:95 to 80:20.

22. The secondary battery of claim 20, wherein a weight ratio of the inorganic filler to the first binder is 10:90 to 50:50.

23. The secondary battery of claim 15, wherein:
the first binder provides an adhesion between the inorganic filler of the first insulation coating layer and the first electrode tab, and
the first insulation coating layer electrically insulates the first electrode tab from another electrode in the electrode assembly.

24. The secondary battery of claim 15, wherein the insulation coating layer further includes a dispersing agent in an amount of 0.1 to 5 wt % based on a total weight of the inorganic filler.

25. The secondary battery of claim 15, wherein:
the electrode assembly further includes:
a second electrode having an opposite polarity from the first electrode;
a second electrode tab extending from the second electrode; and
a second insulation coating layer disposed on the second electrode tab and having the same binder as the first binder in the first insulation coating layer on the first electrode tab.

26. The secondary battery of claim 15, wherein the first electrode is a positive electrode, and a first electrode tab is a positive electrode tab.

27. The secondary battery of claim 15, wherein:
the first electrode and the first electrode tab include respective portions of a first electrode current collector in the electrode assembly,
the insulation coating layer is coated on the first electrode tab portion of the first electrode current collector, and the first electrode comprises:
a portion of the first electrode current collector not coated with the insulation coating layer; and
a mixture including an electrode active material, a conductive material, and a second binder applied to the portion of the first current collector not coated with the insulation coating layer.

28. The secondary battery of claim 15, wherein:
the first electrode further includes an active material layer without being coated the insulation coating layer, and
a thickness of the insulation coating layer is smaller than a thickness of the active material layer.

* * * * *